United States Patent
Vohra et al.

(10) Patent No.: US 10,445,063 B2
(45) Date of Patent: Oct. 15, 2019

(54) METHOD AND APPARATUS FOR CLASSIFYING AND COMPARING SIMILAR DOCUMENTS USING BASE TEMPLATES

(71) Applicant: Adobe Inc., San Jose, CA (US)

(72) Inventors: Lalit Vohra, New Delhi (IN); Aditya Kumar Pandey, New Delhi (IN); Yash Kumar Gupta, Agra (IN)

(73) Assignee: Adobe Inc., San Jose, CA (US)

( * ) Notice: Subject to any disclaimer, the term of this patent is extended or adjusted under 35 U.S.C. 154(b) by 117 days.

(21) Appl. No.: 14/028,894

(22) Filed: Sep. 17, 2013

(65) Prior Publication Data
US 2015/0081681 A1    Mar. 19, 2015

(51) Int. Cl.
| | | |
|---|---|---|
| *G06F 16/35* | (2019.01) | |
| *G06F 16/248* | (2019.01) | |
| *G06F 16/38* | (2019.01) | |
| *G06F 16/2457* | (2019.01) | |
| *G06F 7/24* | (2006.01) | |

(52) U.S. Cl.
CPC .............. *G06F 7/24* (2013.01); *G06F 16/248* (2019.01); *G06F 16/2457* (2019.01); *G06F 16/35* (2019.01); *G06F 16/38* (2019.01)

(58) Field of Classification Search
None
See application file for complete search history.

(56) References Cited

U.S. PATENT DOCUMENTS

| | | | |
|---|---|---|---|
| 5,258,855 A * | 11/1993 | Lech | G06K 9/2054 358/448 |
| 5,987,448 A * | 11/1999 | Evans et al. | |
| 8,165,958 B1 * | 4/2012 | McLaughlin | G06Q 20/10 705/39 |
| 8,724,907 B1 * | 5/2014 | Sampson et al. | 382/218 |
| 2004/0213458 A1 * | 10/2004 | Kanatsu | G06F 17/30011 382/181 |
| 2009/0083677 A1 * | 3/2009 | Darwish et al. | 715/854 |
| 2009/0119261 A1 * | 5/2009 | Ismalon | G06F 17/3064 |
| 2009/0172513 A1 * | 7/2009 | Anderson | G06F 17/211 715/210 |
| 2010/0287150 A1 * | 11/2010 | Downum | G06F 17/30864 707/706 |
| 2011/0078098 A1 * | 3/2011 | Lapir | G06F 17/27 706/12 |
| 2011/0119262 A1 * | 5/2011 | Dexter | G06F 17/30014 707/726 |
| 2012/0278705 A1 * | 11/2012 | Yang et al. | 715/254 |
| 2013/0124376 A1 * | 5/2013 | Lefebvre | G06Q 20/102 705/34 |
| 2014/0244490 A1 * | 8/2014 | Miller et al. | 705/40 |
| 2015/0269160 A1 * | 9/2015 | Babaian | G06F 17/30038 707/751 |

\* cited by examiner

*Primary Examiner* — Giuseppi Giuliani
(74) *Attorney, Agent, or Firm* — Keller Jolley Preece

(57) ABSTRACT

A computer implemented method and apparatus for classifying and comparing similar documents using base templates. The method comprises accessing a document; extracting metadata from the document; matching the metadata to at least one base template of a plurality of base templates; and storing the document with one or more similar documents, wherein the one or more similar documents are documents that match the at least one base template.

20 Claims, 6 Drawing Sheets

| | NAME ▲ | LOCATION | DATE ADDED |
|---|---|---|---|
| ☐ | 🗎 AIRTEL BILL 04052013.pdf<br>— AMOUNT DUE 477.14 | YOUR COMPUTER | JULY 19, 2013 11:54 |
| ☐ | 🗎 AIRTEL BILL 05052013.pdf<br>— AMOUNT DUE 918.23 | YOUR COMPUTER | JULY 24, 2013 18:15 |

FIG. 5 ively relate to document management and, more particularly, to a method and apparatus for classifying and comparing similar documents using base templates.

METHOD AND APPARATUS FOR CLASSIFYING AND COMPARING SIMILAR DOCUMENTS USING BASE TEMPLATES

BACKGROUND OF THE INVENTION

Field of the Invention

Embodiments of the present invention generally relate to document management and, more particularly, to a method and apparatus for classifying and comparing similar documents using base templates.

Description of the Related Art

Documents are uploaded to on-line document stores such as ADOBE® Document Cloud, ADOBE® Creative Cloud™, and the like, and are typically stored in a folder hierarchy. When a document is uploaded, a user must manually compare and classify the document, and then store the document in an appropriate folder. For example, a user may have a folder entitled "Bills" that includes sub-folders for similar documents, such as a sub-folder for each of the user's phone bill, cable bill, credit card bill, bank statements, and the like. As the volume of documents that may be kept in the document store increases over time, it becomes difficult for a user to compare and classify a particular document or set of documents.

Therefore, there is a need for a method and apparatus for classifying and comparing similar documents using base templates.

SUMMARY OF THE INVENTION

A method for classifying and comparing similar documents using base templates is described. In one embodiment, a document is accessed. Metadata is extracted from the document and matched to a base template. The document is stored with one or more similar documents, where the one or more similar documents are documents that match the base template.

In another embodiment, an apparatus for classifying and comparing similar documents using base templates is described. The apparatus includes a document classifier for accessing a document, extracting metadata from the document, matching the metadata to at least one base template of a plurality of base templates, and storing the document with one or more similar documents, wherein the one or more similar documents are documents that match the at least one base template.

In yet another embodiment, a non-transient computer readable medium is described. Computer instructions are executed by a processor that accesses a document. Metadata is extracted from the document and matched to a base template. The document is stored with one or more similar documents, where the one or more similar documents are documents that match the base template.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 illustrates a screenshot of a return of search as performed by the document display module of FIG. 1, according to one or more embodiments.

Figure 1:
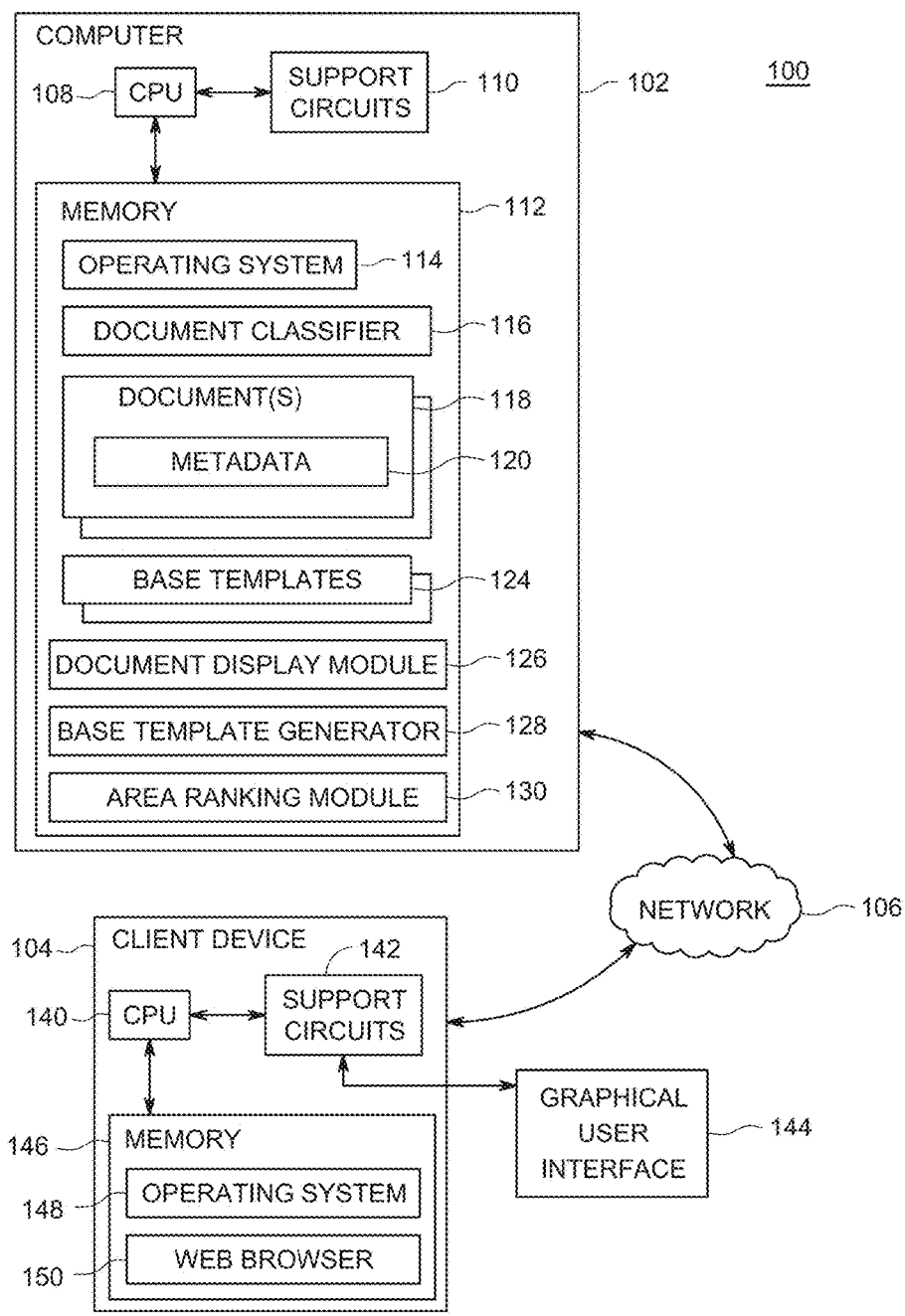
FIG. 1 is a block diagram of an apparatus for classifying and comparing similar documents using base templates, according to one or more embodiments.

While the method and apparatus is described herein by way of example for several embodiments and illustrative drawings, those skilled in the art will recognize that the method and apparatus for classifying and comparing similar documents using base templates is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for classifying and comparing similar documents using base templates defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus for classifying and comparing similar documents using base templates. The embodiments group similar documents in a document store. The documents are then classified based on metadata, such as a date of a document, a name or title of the document, a number of pages of the document, an author or publisher of the document and document textual content along with the position of the textual content. The documents are mapped into sets of similar documents. For example, cell phone statements are mapped into one set, while credit card statements are mapped into another set. A base template is generated that includes information that is found most commonly across the set of similar documents. Common elements may include a company name, logo, and address, a list of charges, an advertisement area, and the like. The elements of a document that change in, for example, a billing statement may be a billing period, a previous balance, payments, current changes, amount payable, and the like. Once classified, the documents may be viewed in such a way that the changed elements are clearly displayed in relation the common elements. Alternatively, a report may be displayed in, for example, a spreadsheet showing the changed elements for the set of similar documents for a specified period of time. Further, documents may be searched and displayed as an image that includes snapshots of areas where the search term occurs. For example, a search for "current charges"

results in the display of an image with snapshots of the area of each document in the set of similar documents that displays the current charges, allowing a user to visualize their spending history.

Advantageously, document management services, such as Acrobat.com, from ADOBE Systems Incorporated, in San Jose, Calif. can provide users with a document access solution that provides an efficient way to search and organize documents based on base templates. The present invention also provides a method to compare similar documents and identify differences between them based on the base templates. Further, the present invention provides a method to correlate identified differences and visualize trends and statistics.

Various embodiments of a method and apparatus for classifying and comparing similar documents using base templates are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of an apparatus 100 for classifying and comparing similar documents using base templates, according to one or more embodiments. The system 100 includes a computer 102, a plurality of client devices, for example a client device 104, communicatively coupled to one another via a network 106. The computer 102 is a server for a document repository, such as Acrobat.com from ADOBE Systems, Incorporated. The computer 102 stores user documents in the cloud, e.g., a blade server, virtual machine, and the like. Examples of the computer 102 include, but are not limited to desktop computers, laptops, tablet computers, Smartphones, and the like. The computer 102, hereafter referred to as document repository 102, includes a Central Processing Unit (CPU) 108, support circuits 110, and a memory 112. The CPU 108 may include one or more commercially available microprocessors or microcontrollers that facilitate data processing and storage. The various support circuits 110 facilitate the operation of the CPU 108 and include one or more clock circuits, power supplies, cache, input/output circuits, and the like. The memory 112 includes at least one of Read Only Memory (ROM), Random Access Memory (RAM), disk drive storage, optical storage, removable storage and/or the like.

The memory 112 includes an operating system 114, a document classifier 116, a plurality of documents 118, a plurality of base templates 124, a document display module 126, a base template generator 128, and an area ranking module 130. Each document 118 includes metadata 120. The operating system 114 may include various commercially known operating systems.

The client device 104 is a computing device, such as a desktop computer, laptop, tablet computer, and the like that includes or is attached to a graphical user interface 144. The client device 104 includes a Central Processing Unit (CPU) 140, support circuits 142, and a memory 146. The CPU 140 may include one or more commercially available microprocessors or microcontrollers that facilitate data processing and storage. The various support circuits 142 facilitate the operation of the CPU 140 and include one or more clock circuits, power supplies, cache, input/output circuits, and the like. The memory 146 includes at least one of Read Only Memory (ROM), Random Access Memory (RAM), disk drive storage, optical storage, removable storage and/or the like. The memory 146 includes an operating system 148 and a web browser 150 that may be used to access the document repository 102. According to some embodiments, the web browser 150 may be utilized to view documents 118. Examples of web browser 150 may include, but are not limited to, FIREFOX®, GOOGLE® CHROME™, INTERNET EXPLORER®, OPERA™, and SAFARI®, ANDROID® browser, FIREFOX® for mobile, INTERNET EXPLORER® Mobile, among others.

The network 106 includes a communication system that connects computers (or devices) by wire, cable, fiber optic and/or wireless link facilitated by various types of well-known network elements, such as hubs, switches, routers, and the like. The network 106 may be a part of the Intranet using various communications infrastructure, such as Ethernet, Wi-Fi, a personal area network (PAN), a wireless PAN, Bluetooth, Near field communication, and the like.

Documents 118 uploaded to the document repository 102, from the client device 104, are stored in the document repository 102 and must be classified. The document classifier 116 accesses each document 118. Information regarding the document 118 is extracted and stored as metadata 120. The metadata 120 includes a date of the document 118, a name or title, a number of pages, an author of publisher, textual content and the position of the textual content in the document 118, date information, such as date modified, date created, last-accessed date, and the like. The document classifier 116 compares the metadata 120 with existing base templates 124. If a match is found, the document classifier 116 updates the base template 124 to include an entry that identifies the document 118 as part of a set of similar documents. All similar documents having the same base template 124. The document classifier 116 then stores the document 118 in an appropriate folder with other similar documents 118. For example, all documents 118 that are electric bill statements from ElectricCompanyA are similar documents and as such, have a document identifier or document name from the metadata 120 included in the base template 124 and stored in a folder with other electric bill statements from ElectricCompanyA. If no match is found, the base template generator 128 generates a base template 124 for the document. The area ranking module 130 then ranks areas in the base template 124 such that areas with differing content (i.e., content that changes from one document to the next) are ranked according to importance. For example, a billing amount may be considered more important than a billing date. All documents 118 are processed to classify the documents 118 into sets of similar documents. The same procedure is utilized to classify and store new documents 118 uploaded to the document repository 102 from the client device 104.

When a user previews a document 118 via the graphical user interface 144, in some embodiments, the document display module 126 compares the document metadata 120 to the base template 124. The base template 124 identifies a plurality of common elements of a set of similar documents 118. In some embodiments, the document display module 126 displays the document 118, but masks the common elements of the document 118 that are common to all documents in the set of similar documents 118 and clearly displays the uncommon elements (i.e., elements that change in each document). In some embodiments, the document display module 126 uses other methods to identify elements in the document 118 that have changes, using for example, highlighting, bolding, and the like.

Then a user may select, via the graphical user interface 144, an option to consolidate document information for a given set of similar documents 118. The document display module 126 determines the base template 124 that is associated with the set of similar documents 118, compares the document metadata 120 to the base template 124 and consolidates the differences between the documents 118 in the set of similar documents 118 into a single document, for example, a spreadsheet. This is useful for documents 118 such as credit card statements or banking statements. Because the documents 118 are already classified using the document classifier 116, the consolidated document information may be extracted quickly.

When a user searches for specific content included in a set of similar documents 118, the document display module 126 extracts the area of each document 118 that includes the search term. The document display module 126 then generates an image that includes snapshots of the area in each of the documents 118 in a set of similar documents 118 where the search term occurs. This is useful for a user to see, for example, the current balance of their bank statement in each document for a predefined period of time, for example, the last year. Although, the present disclosure discusses three types of user interaction with documents 118 in the document repository 102, it is appreciated that other embodiments of the present disclosure envision additional possible user interactions.

Figure 2:
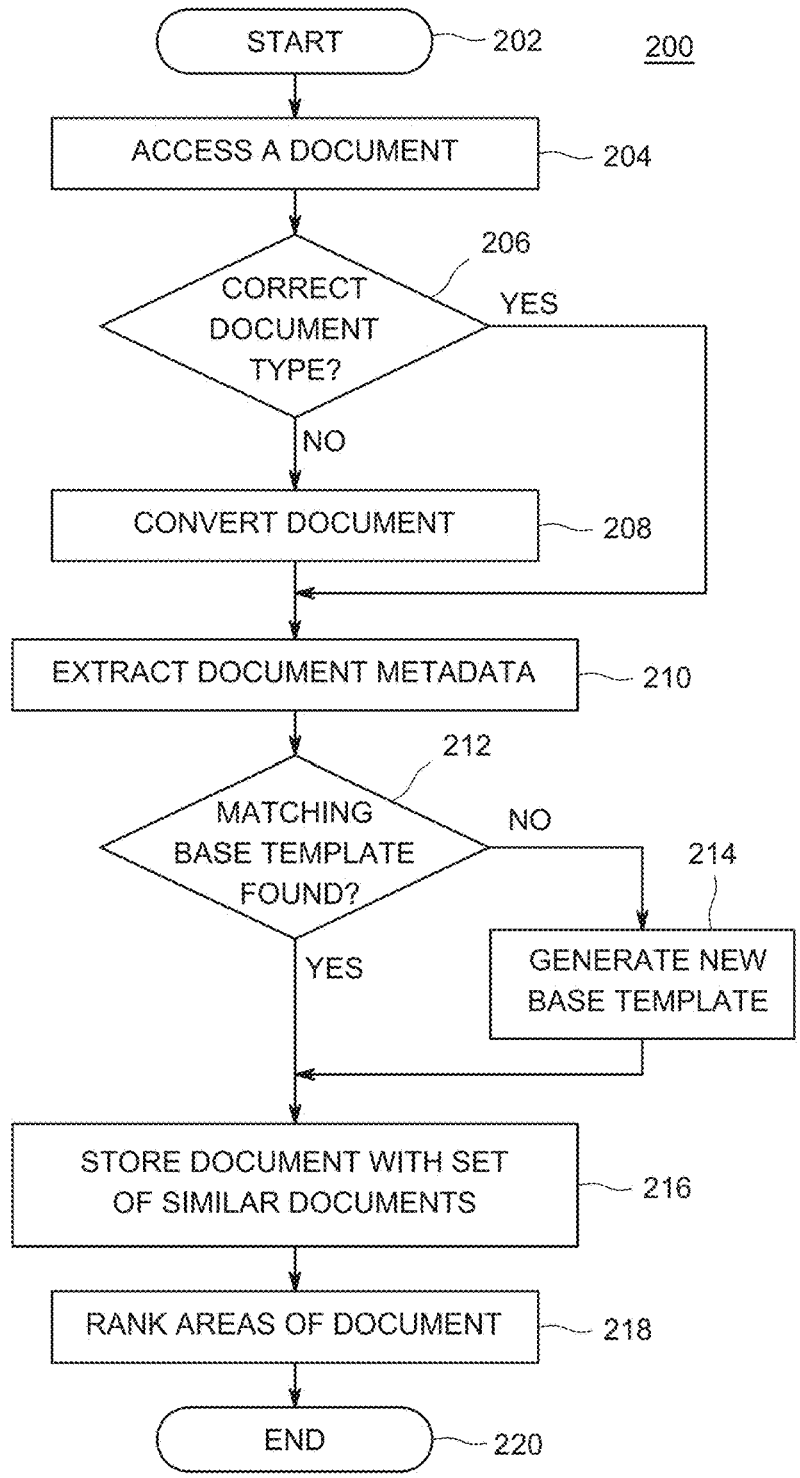
FIG. 2 depicts a flow diagram of a method for classifying similar documents using base templates as performed by the document classifier of FIG. 1, according to one or more embodiments.

FIG. 2 depicts a flow diagram of a method 200 for classifying similar documents using base templates as performed by the document classifier 116 of FIG. 1, according to one or more embodiments. The method 200 is initially performed on a document repository to classify documents already stored therein and is later performed when a new document is uploaded to the document repository. The method 200 classifies documents by matching metadata from a document with one or more base templates. The method 200 starts at step 202 and proceeds to step 204.

At step 204, the method 200 accesses a document. The document may be any type of document, such as a MICROSOFT Word document or a Portable Document Format (PDF) document, and the like. The document may be a credit card statement, a cell phone bill, or any one-time or recurring type of document. The method 200 optionally proceeds to step 206, where the method 200 determines whether the document is of a correct document type. In some embodiments, the method 200 classifies the document in its original format. In some embodiments, the method 200 classifies documents after the documents have been converted to a specific type of document, for example, a PDF document. As such, in this example, the correct document type is PDF and the method 200 determines whether the document is a PDF. If the method 200 determines that the document is of the specified type, for example, if the document is a PDF, the method 200 proceeds to step 210. However, if at step 206, the method 200 determines that the document is not of the specified type, the method 200 proceeds to step 208.

At step 208, the method 200 converts the document to the specified type. In some embodiments, the method 200 processes all documents as PDF documents. In such embodiments, the method 200 converts the document to a PDF using, for example, ADOBE® CreatePDF. The method 200 proceeds to step 210.

At step 210, the method 200 extracts document metadata. Extensible Metadata Platform (XMP) from ADOBE® is a labeling technology that allows metadata about a document to be embedded in the document itself. The method 200 extracts from the XMP a date of the document. Often, statements are provided monthly, quarterly, or annually. The date of the document is useful in classifying a new document, for example, by determining whether the new document has a date similar to, or next in the date sequence of, a set of similar documents. The method 200 also extracts an author or publisher of the document, a number of pages of the document, a name or title of the document, and textual content (words) along with the positions of the words.

The method 200 proceeds to step 212, where the method 200 determines whether there is a matching base template for the document as described in more detail with respect to FIG. 3 below. Finding a matching base template indicates that at least one document similar to the current document is already classified in the document repository. If the method 200 determines that a matching base template was found, the method 200 proceeds to step 216. At step 216, the method 200 adds the document to a set of similar documents. The method 200 stores the document name in the base template. In some embodiments, the method 200 stores the document in a folder with the set of similar documents. The method 200 stores a document identifier, for example, a document ID or document name in the base template to identify the document as a member of the set of similar documents. In some embodiments, the path, location or Universal Resource Indicator (URI) of the document is stored in the base template. The method 200 proceeds to step 218.

However, if at step 212, the method 200 determines that the document does not match any existing templates, the method 200 proceeds to step 214. At step 214, the method 200 generates a new base template using the document. The base template is a collection of specific properties that a document might have. The specific properties provide a quantitative or qualitative or both, estimate of similarity between two or more documents. If two documents belong to the same template, then it indicates that the two documents depict and describe a similar subject. The method 200 stores, in the base template, the author of all the documents belonging to the base template, a creation date of the document belonging to the base template, a number of pages in the documents belonging to the base template, and various places in the document at which an image appears. The method 200 does not store the image, rather the method 200 stores the position of a bounding box where the image(s) appears. The method 200 stores all page sizes and their styling information. i.e., size of text, size of pages. The method 200 also stores various different words with their location and styling information in addition to relative differences in position of words against immediately preceding text. This is helpful during classification because the words may be slightly offset due to a minor change in language from one document to another. If the difference between two documents, after taking into account relative positioning of text or its reflow, is minor, then slight changes in 2 documents due to addition/deletion of a sentence will not lead to major disruption, and such two documents would still be in the same set of similar documents. Lastly, the method 200 stores differences in the base template. The differences denote points of interest in documents. At these locations, differing values across various documents in this cluster could be aggregated.

An exemplary base template may be as follows:

```
<template id="airtel_bill" version="1.0">
    <metadata>
        <arrival_dates>
            <date id="docid1">5/1/2013</date>
            <date id="docid2">6/1/2013</date>
        </arrival_dates>
        <authors>
            <author>
                <name>Airtel</name>
            </author>
        </authors>
        <names>
            <name>airtel_05012013<name>
            <name>airtel_0612013<name>
        </names>
        <pagecount>3</pagecount>
        <format>pdf</format>
    </metadata>
    <document>

<images>
                <image position="30,40,120,100" ref="cid:image1.png" />
                <image position="240,290,320,340" ref="cid:image1.png" />
            </images>
            <keywords>
                <keyword id="the">
                    <position font="Times New Roman" coords="10,20" rel_coords="5,0" size="12" color="0,0,0" />
                    <position font="Arial" coords="134,123" rel_coords="5,0" size="10" color="0,0,0" />
                </keyword>
                <keyword id="Amount">
                    <position font="Times New Roman" coords="90,210" rel_coords="15,0" size="12" color="0,0,0" style="bold" />
                    <position font="Arial" coords="184,153" rel_coords="15,0" size="10" color="0,0,0" />
                </keyword>
                .
                .
            </keywords>

.
    </document>
    <diffs>
        <position coords="90,250" rel_coords="15,0" avgChars="4" previousTag="Amount" />
        .
    <diffs>
</template>
```

The exemplary base template is a base template for AIRTEL® telephone bills. There are currently two documents (i.e., two AIRTEL telephone bills) in the document repository. The arrival_dates of the documents are listed as May 1, 2013 and Jun. 1, 2013. The author of the documents is AIRTEL because the document is created by AIRTEL. The names of the two documents are listed along with a page count and a file format, in this case PDF. The base template then lists information regarding any images or textual content of the document along with the locations of the textual content that are common in the documents and lastly, lists the differences (i.e., diffs) and their locations where content changes from one document to the next.

The method 200 proceeds to step 216. At step 216, the method 200 stores the document with a set of similar documents. The method 200 stores a document identifier and the document name in the base template. The method 200 may store the document in a folder with the set of similar documents and proceeds to step 218.

At step 218, the method 200 ranks areas of the document. A new document is similar to the other similar documents in the document's set of similar documents. The method 200 identifies areas of the document that are different from past documents in the set. There can be multiple such areas in a document. For example, in a telephone bill, the value of the due date, billing amount, and the billing period are different from earlier telephone bills in the document repository. As such, it is helpful to identify and rank the more important areas of the document. Different ranking is used based on the context of a document. For example, in a billing statement, an area that includes a numerical value is likely to be more important than an area that includes textual content, however, this may not be the case for a filled-in form.

In order to determine context of a document, the method 200 searches for popular "strings" in the document. For example, the presence of the word "Bill", "Amount", or a known merchandiser, such as "AT&T" can help infer the context of the document. In some embodiments, the method 200 uses such rules and inferences to determine context. In other embodiments, techniques, such as Term Frequency-Inverse Document Frequency (TF-IDF) may be used to determine the context of a document.

The method 200 ranks the different areas based on the type of data that exists in the differing areas. For example, in a billing statement, a differing area that includes a numerical value (i.e., float, integral, or currency) is considered to be more important an area that includes textual content because it is more probable that the numerical value is a quantitative value representing a bill amount.

For documents that represent credit card statements, invoices, and the like, the ranking is performed as follows:
A presence of a numerical value in a differing area ranks higher than a differing area that has text present.
A presence of a date in a differing area ranks lower than an area that includes a numerical value but higher than a differing area that includes text.
A presence of a particular piece of data that is present in a document from a previous time period (for example, a previous month's paid bill) has a lower priority than the areas that do not appear in the documents from previous time periods.

Even if the context of the document is not determined or is determined incorrectly, the result is an arbitrary delegation of priority order for a given base template. In such cases, other rules may be applied, as follows:
If a particular data has been searched or has appeared in any past search query made by the given user, then the data around the differing area is rated higher than others.
If data at a particular differing area has a different and a more prominent style then the ones present in other areas, then that area is marked higher.
If a user has copied a particular area of text on a past document within the same template, then that area is ranked higher.
If a user has commented on a particular area on a past document within the same template, then that area is ranked higher.
If a particular area has been viewed on a past document much more than other areas, then that area is ranker higher.

The method 200 stores the ranking of the differing areas of the document in the metadata of the document. The method 200 proceeds to step 220 and ends.

Figure 3:
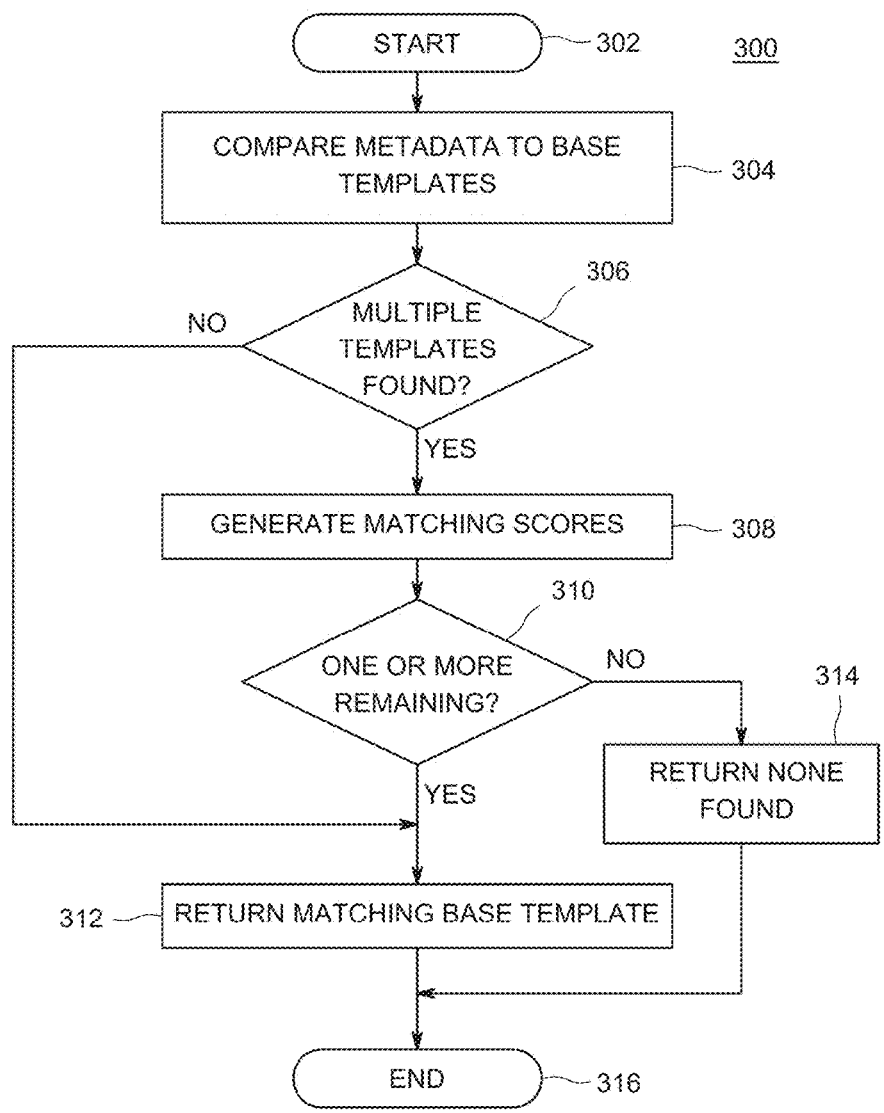
FIG. 3 depicts a flow diagram of a method for matching a document to a base template as performed by the document classifier of FIG. 1, according to one or more embodiments.

FIG. 3 depicts a flow diagram of a method 300 for matching a document to a base template as performed by the document classifier of FIG. 1, according to one or more embodiments. The method 300 uses metadata from a document and compares the metadata to the base templates in the document repository. A base template that meets the most relevant criteria above a predefined threshold is determined to be the matching base template. The method 300 starts at step 302 and proceeds to step 304.

At step 304, the method 300 compares metadata from the document to each base template in the document repository. The metadata was extracted in step 210 above. A number of criteria are used to determine whether the base template is to be considered a possible base template for the document. In some embodiments, as described below, all criteria must be met in order for the base template to be considered a possible base template for the document. In some embodiments, not all criteria must be met; rather the number of criteria met must meet a pre-defined threshold in order for the base template to be considered a possible base template for the document. Two types of criteria may be used for matching, such as determining whether identifying characteristics of the document are similar to identifying characteristics of documents in the base template, such as a date, document name, author, or page count. Also, elements of the document are matched with the common elements in a base template, such as a position of one or more images, a number of words, a location of each word, and the like.

The method 300 determines if the dates of existing documents in base templates form an arithmetic progression and whether the creation date of the current document fits in the existing arithmetic progression. For example, if a set of documents, such as a utility bill have creation dates of January 1, February 1, and March 1, the current document fits in the progression is it has a creation date of April 1.

If the creation date of the current document does not in the existing arithmetic progression, the base template is out of contention and a next base template is considered. If the creation date of the current document does fit into the existing arithmetic progression, the method 300 determines whether a largest common substring of names of the existing documents in the base template matches the name of the new document. For example, a utility bill with a document name of, for example, "ElectricCompanyA.March.bill" has a larger common substring of names with a document with name "ElectricCompanyA.April.bill" than with a document with name "WaterCompanyA.March.bill". As such, the method 300 determines whether the author and number of pages of the document are similar to the author and number of pages in the base template. For example, a set of documents, such as a utility bill may have an author of ElectricCompanyA and a page count of 3. If the author and page count are similar, the method 300 determines whether the absolute or relative position of images inside the pages of the new document is similar to the ones present in the base template. For example, a company logo and an advertising image are often located in the same position on each bill from a given company. If the above conditions are met, the base template is considered a possible base template for the document.

The process of step 304 is repeated where the metadata of the document is compared with each base template. The comparison includes searching the metadata in the base template and determining what criteria is met for each base template. When all base templates have been evaluated, the method 300 proceeds to step 306, where the method 300 determines whether more than one base template was found at step 304. If the method 300 determines that multiple base templates were not found, the method 300 proceeds to step 312. However, if at step 306, the method 300 determines that multiple base templates are potential matches for the document, the method 300 proceeds to step 308, where the method 300 calculates a matching score for each base template that is a potential match.

The method 300 compares the different words present in the document with the words present in the base template and calculates a score representing the number of matching words. If the number of words that match is above a predefined threshold, then a word location variance is calculated. A word location variance is distance of a word in a document from its original location as specified by the base template. For example, a utility bill may include the words "Amount Due". The original location of each of these words in the first utility bill is stored in the base template. Due to the addition of a new field on a bill or just a misalignment of the paper during printing, each word may be offset from its original location. If the calculated word location variance is within a predefined threshold, the base template is a possible match for the document. When a matching score has been calculated for each base template, the method 300 proceeds to step 310.

At step 310, the method 300 determines whether one or more base templates are found to be possible matches for the document. If the method 300 determines that no matches were found that were possible matches, the method 300 proceeds to step 314, where the method 300 returns a message that no base templates were found that match the document and the method 300 proceeds to step 316 and ends.

However, if at step 310, the method 300 determines that one or more base templates were found to be possible matches for the document, the method 300 proceeds to step 312 where the base template with the highest matching score calculated at step 308 is returned as the matching base template. In some embodiments, when multiple base templates are found to be possible matches, the method 300 displays to a user the potential base template matches and the method 300 receives user input that provides a selection of the matching base template. The method 300 proceeds to step 316 and ends.

Figure 4:
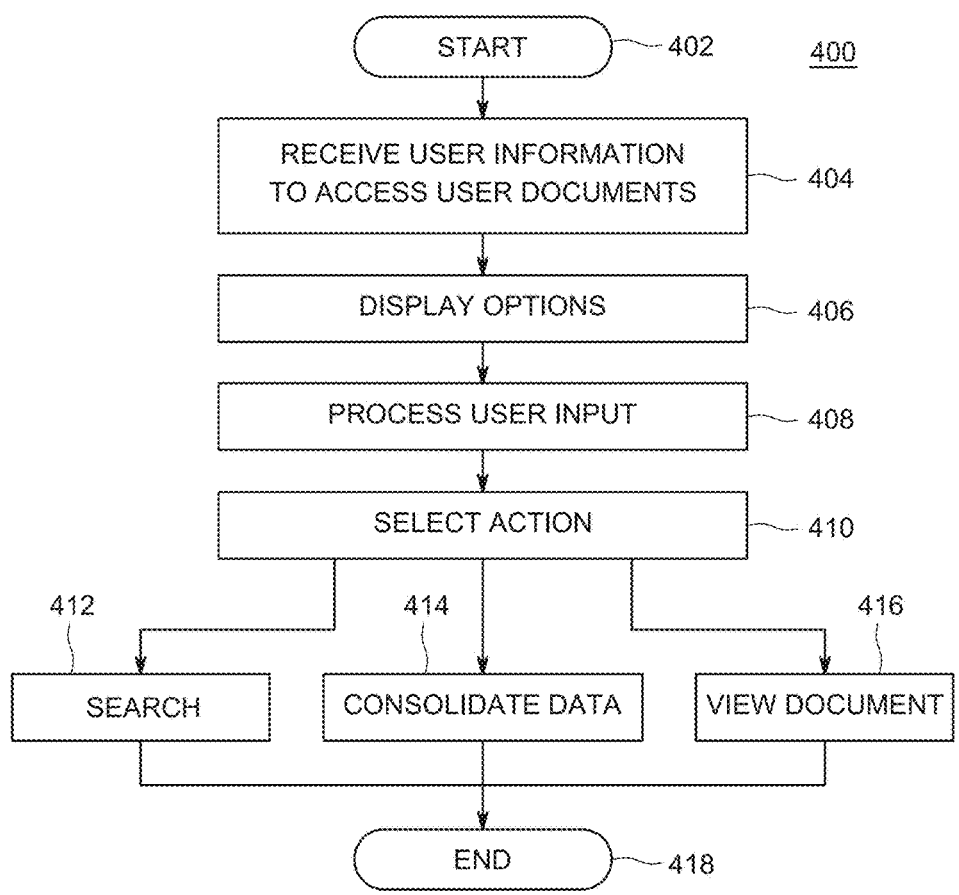
FIG. 4 depicts a flow diagram of a method for searching and displaying documents using base templates as performed by the document display module of FIG. 1, according to one or more embodiments.

FIG. 4 depicts a flow diagram of a method 400 for searching and displaying documents using base templates as performed by the document display module 126 of FIG. 1, according to one or more embodiments. The method 400 receives input from a user via a graphical user interface, searches for and displays one or more documents according to several embodiments of the invention. The method 400 starts at step 402 and proceeds to step 404. At step 404, the method 400 receives user information, such as a login and accesses an area of the document repository associated with the received user information.

The method 400 proceeds to step 406, where the method 400 displays selectable options to a user. The options may include, but are not limited to, performing a search of a set of similar documents, viewing a consolidated report for a set of similar documents, viewing a selected document, and the like. The method 400 also displays folders that represent the different sets of similar documents that are stored in the document repository for the user.

The method 400 proceeds to step 408, where the method 400 receives and processes user input. User input may be received from a touch screen on a mobile device, from button selection or text input on a keypad of a computer, or any other input method known in the art. The method 400 proceeds to step 410. At step 410, the method 400 selects an action based on the user input.

In one embodiment, the method 400 selects a search action and proceeds to step 412. At step 412, the method 400 searches a document repository for a search term as the user input. At step 412, the method 400 displays all documents that include the search term, as illustrated with respect to FIG. 5 below. In some embodiments, a snapshot of points of interest within the document are displayed with the search results.

In another embodiment, the method 400 selects a consolidation action for a set of similar documents and proceeds to step 414. At step 414, the method 400 extracts relevant data from a set of similar documents, then consolidates and displays the data. The data may be displayed in a spreadsheet, graph or other manner selected by a user. For example, a user may select a consolidation action for a set of telephone bill statements. In some embodiments, the method 400 may return the following:

TABLE 1

| S. No. | Document name | Due Date | Bill Amount |
|---|---|---|---|
| 1 | Airtel Bill 04052013 | $5^{th}$ May 2013 | 477.13 |
| 2 | Airtel Bill 05052013 | $5^{th}$ June 2013 | 918.23 |
| 3 | Airtel Bill 06052013 | $5^{th}$ July 2013 | 631.75 |

In some embodiments, the data that is displayed is based on the rankings determined in step 218 above. In the present example, the due date and bill date are the highest ranked areas of the telephone bill statements.

In yet another embodiment, the method 400 selects a view document action and proceeds to step 416. At step 416, the method 400 displays the document, automatically indicating important areas of the document, as illustrated with respect to FIG. 6 below.

It is appreciated that although FIG. 4 illustrates three potential actions, other embodiments of the present disclosure envision additional possible document repository search actions. The method 400 proceeds to step 418 and ends.

FIG. 5 illustrates a screenshot 500 of a return of search as performed by the document display module 126 of FIG. 1, according to one or more embodiments. The screenshot 500 displays a search area 502, where the term "Airtel" is entered. A display area 504 displays two documents that were retrieved from the search. A snapshot 506 of a relevant portion of the documents is displayed. The snapshot 506 may be of a highest ranked portion of a document or other criteria may be utilized to determine what portion of the document is displayed in the snapshot 506.

Figure 6:
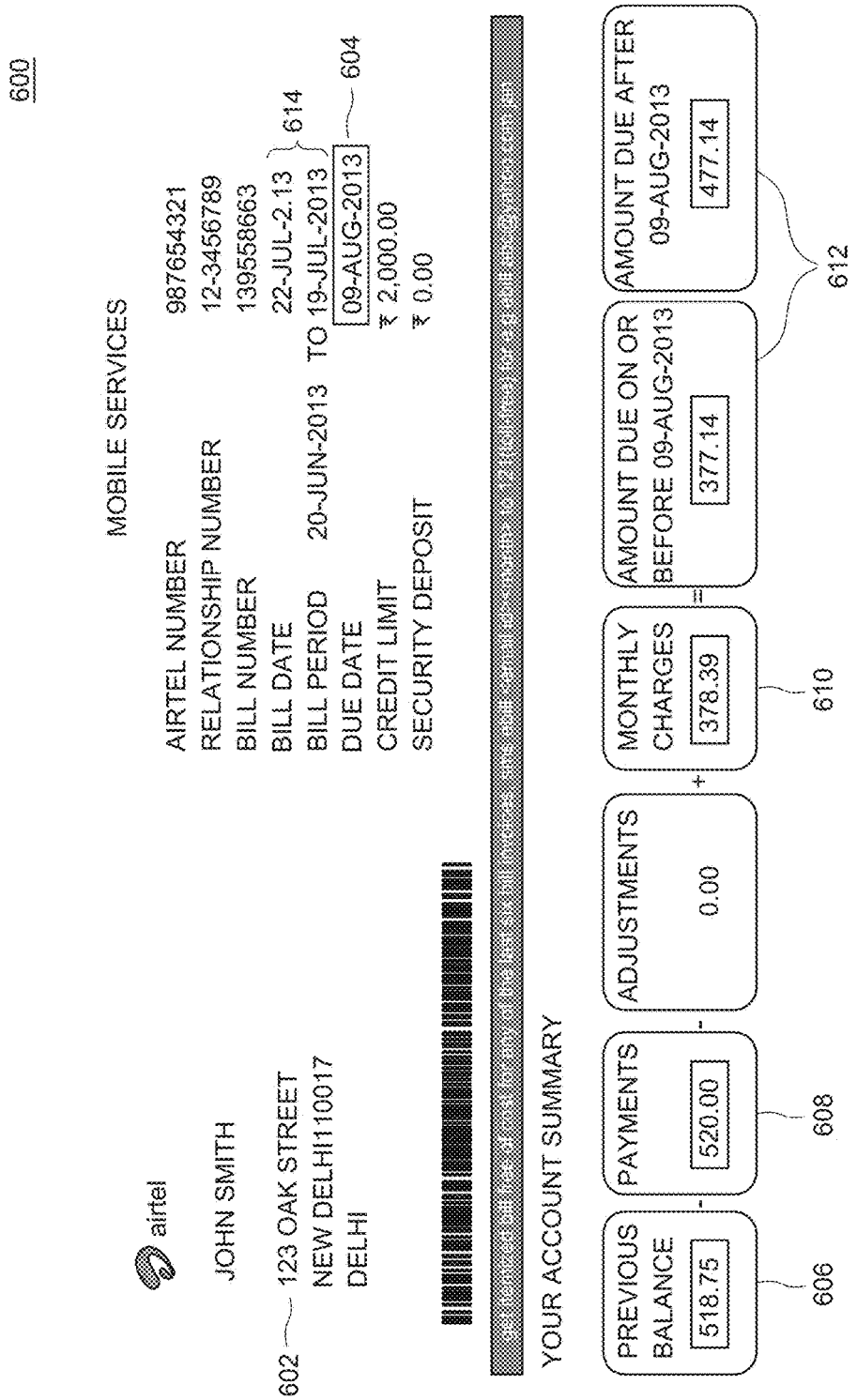
FIG. 6 illustrates a screenshot of a display of a single document, as performed by the document display module of FIG. 1, according to one or more embodiments.

FIG. 6 illustrates a screenshot 600 of a display of a single document, as performed by the document display module 126 of FIG. 1, according to one or more embodiments. The current example is a screenshot 600 of a statement for telephone bill. Certain areas 602 of the document are unchanged with each statement. However, areas such as due data 604, previous balance 606, payments 608, monthly charges 610, amount due 612, and bill date and bill period 614 change with each statement. The areas of the statement that change and are determined to be important are depicted in a manner that identifies them as important. In the present example, only areas 604, 606, 608, 610 and 612 are deemed important and depicted with a rectangular box. Other method may be used to indicate that the area is important. For example, the areas may be color coded, the unimportant areas may be distorted while the important areas are clear, any method of differentiating the important areas, or any other graphical filter may be utilized.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
accessing a document;
extracting metadata from the document;
matching the metadata to a plurality of base templates;
determining, for each of the plurality of base templates, a matching score by:
 generating an initial score representing a number of matching words between the base template and the document,
 based on the initial score being above a predefined threshold, generating a word location variance representing a distance of a word in the document from an original location of the word in the base template, and
 generating the matching score for the base template based on the initial score and the word location variance;
storing the document with one or more similar documents, wherein the one or more similar documents are documents that match a base template with the highest matching score and a date associated with the document forms an arithmetic progression with dates associated with the one or more similar documents;
retrieving, in response to a search query associated with the base template with the highest matching score, a plurality of documents that match the base template;
identifying, using the base template, any portions of each of the plurality of documents that change from one document to a next document;
determining one or more highly ranked portions of the portions that change from one document to the next document by:

determining a context of the plurality of documents;
identifying, from the portions that change from one document to the next document and based on the context, contextually important portions;
ranking the contextually important portions higher than other portions that change;
identifying contextually important portions that contain numerical values and contextually important portions that contain text; and
additionally ranking the contextually important portions that contain numerical values higher than the contextually important portions that contain text; and
generating, in response to the search query, a consolidated display of each of the plurality of documents, wherein generating the consolidated display comprises:
extracting the one or more highly ranked portions; and
providing, in the consolidated display, the one or more highly ranked portions in ranked order.

2. The method of claim 1, wherein each base template in the plurality of base templates identifies at least one property of a plurality of properties that is the same across a set of similar documents.

3. The method of claim 2, wherein the at least one property comprises at least one of an author, a page count, one or more locations of one or more images, a plurality of text words that are the same across the set of similar documents, and a location for each text word in the plurality of text words that are the same, a plurality of text words that change in each document across the set of similar documents, or a location for each text word in the plurality of text words that change.

4. The method of claim 1, wherein matching the metadata to the plurality of base templates comprises:
determining whether one or more identifying characteristics of the document are similar to identifying characteristics in each of the plurality of base templates, wherein identifying characteristics comprise at least one of a document date, document name, author, or page count; and
determining that common elements in the document are the same as common elements in each of the plurality of base templates.

5. The method of claim 4, wherein common elements comprise at least one of a position of one or more images in one or more pages of the document, a number of words in the document, and a location of the words in the document.

6. The method of claim 1, further comprising, ranking a contextually important portion that has been previously viewed higher than a contextually important portion that has not been previously viewed.

7. The method of claim 6, further comprising:
ranking a contextually important portion that has a different style higher than a contextually important portion that does not have a different style,
ranking a contextually important portion that has been copied higher than a contextually important portion that has not been copied, and
ranking a contextually important portion that has been commented on higher than a contextually important portion that has not been commented on.

8. The method of claim 6, wherein ranking the contextually important portions higher than other identified portions is based on metadata associated with each of the retrieved plurality of documents.

9. The method of claim 6, wherein determining the context of the plurality of documents comprises performing one or more of: searching for popular strings of text across the plurality of documents, or analyzing the base template with the highest matching score.

10. The method of claim 1, wherein generating the consolidated display further comprises excluding one or more lowly ranked portions.

11. A system for classifying and comparing similar documents using base templates comprising:
at least one processor;
at least one non-transitory computer-readable storage medium storing instructions thereon that, when executed by the at least one processor, cause the system to:
access a document;
extract metadata from the document;
match the metadata to a plurality of base templates;
determine, for each of the plurality of base templates, a matching score by:
generating an initial score representing a number of matching words between the base template and the document,
based on the initial score being above a predefined threshold, generating a word location variance representing a distance of a word in the document from an original location of the word in the base template, and
generating the matching score for the base template based on the initial score and the word location variance;
store the document with one or more similar documents, wherein the one or more similar documents are documents that match base template with the highest matching score and a date associated with the document forms as arithmetic progression with dates associated with the one or more similar documents;
retrieve, in response to a search query associated with the base template with the highest matching score, a plurality of documents that match the base template;
identify, using the base template, any portions of each of the retrieved plurality of documents that change from one document to a next document;
determine one or more highly ranked portions of the portions that change from one document to the next document by:
determining a context of the plurality of documents;
identifying, from the identified portions that change from one document to the next document and based on the context, contextually important portions;
ranking the contextually important portions higher than other identified portions that change;
identifying contextually important portions that contain numerical values and contextually important portions that contain text; and
additionally ranking the contextually important portions that contain numerical values higher than the contextually important portions that context text; and
generate, in response to the search query, a consolidated display of each of the plurality of documents, wherein generating the consolidated display comprises:
extracting the one or more highly ranked portions; and
providing, in the consolidated display, the one or more highly ranked portions in ranked order.

12. The system of claim 11, wherein each base template in the plurality of base templates identifies at least one property of a plurality of properties that is the same across a set of similar documents.

13. The system of claim 12, wherein the at least one property comprises at least one of an author, a page count, one or more locations of one or more images, a plurality of text words that are the same across the set of similar documents, and a location for each text word in the plurality of text words that are the same, a plurality of text words that change in each document across the set of similar documents, or a location for each text word in the plurality of text words that change.

14. The system of claim 11, wherein matching the metadata to the plurality of base templates comprises:
   determining whether one or more identifying characteristics of the document are similar to identifying characteristics in each of the plurality of base templates, wherein identifying characteristics comprise at least one of a document date, document name, author, or page count; and
   determining whether common elements in the document are the same as common elements in each of the plurality of base templates.

15. The system of claim 14, wherein common elements comprise at least one of a position of one or more images in one or more pages of the document, a number of words in the document, and a location of the words in the document.

16. A non-transitory computer readable medium for storing computer instructions that, when executed by at least one processor causes the at least one processor to perform steps of classifying and comparing similar documents using base templates comprising:
   accessing a document;
   extracting metadata from the document;
   matching the metadata to a plurality of base templates;
   determining, for each of the plurality of base templates, a matching score by:
      generating an initial score representing a number of matching words between the base template and the document,
      based on the initial score being above a predefined threshold, generating a word location variance representing a distance of a word in the document from an original location of the word in the base template, and
      generating the matching score for the base template based on the initial score and the word location variance;
   storing the document with one or more similar documents, wherein the one or more similar documents are documents that match a base template with the highest matching score and a date associated with the document forms an arithmetic progression with dates associated with the one or more similar documents;
   retrieving, in response to a search query associated with the base template with the highest matching score, a plurality of documents that match the base template;
   identifying, using the base template with the highest matching score, any portions of each of the plurality of documents that change from one document to a next document;
   determining one or more highly ranked portions of the portions that change from one document to the next document by:
      determining a context of the plurality of documents;
      identifying, from the portions that change from one document to the next document and based on the determined context, contextually important portions;
      ranking the contextually important portions higher than other identified portions;
      identifying contextually important portions that contain numerical values and contextually important portions that contain text; and
      additionally ranking the contextually important portions that contain numerical values higher than the contextually important portions that contain text; and
   generating, in response to the search query, a consolidated display of each of the plurality of documents, wherein generating the consolidated display comprises:
      extracting the one or more highly ranked portions; and
      providing, in the consolidated display, the one or more highly ranked portions in ranked order.

17. The computer readable medium of claim 16, wherein each base template in the plurality of base templates identifies at least one property of a plurality of properties that is the same across a set of similar documents.

18. The computer readable medium of claim 17, wherein the at least one property comprises at least one of an author, a page count, one or more locations of one or more images, a plurality of text words that are the same across the set of similar documents, and a location for each text word in the plurality of text words that are the same, a plurality of text words that change in each document across the set of similar documents, or a location for each text word in the plurality of text words that change.

19. The computer readable medium of claim 16, wherein matching the metadata to the plurality of base templates comprises:
   determining whether one or more identifying characteristics of the document are similar to identifying characteristics in each of the plurality of base templates, wherein identifying characteristics comprise at least one of a document date, document name, author, or page count; and
   determining that common elements in the document are the same as common elements in each of the plurality of base templates.

20. The computer readable medium of claim 19, wherein common elements comprise at least one of a position of one or more images in one or more pages of the document, a number of words in the document, and a location of the words in the document.

* * * * *